Dec. 23, 1924.

B. H. BÖRRESON 1,520,324

VEHICLE LICENSE OR CARD HOLDER

Filed June 4, 1923         2 Sheets-Sheet 1

INVENTOR
BÖRRE H. BÖRRESON
By Paul, Paul & Moore
ATTORNEYS

Dec. 23, 1924.
B. H. BÖRRESON
1,520,324
VEHICLE LICENSE OR CARD HOLDER
Filed June 4, 1923 2 Sheets-Sheet 2
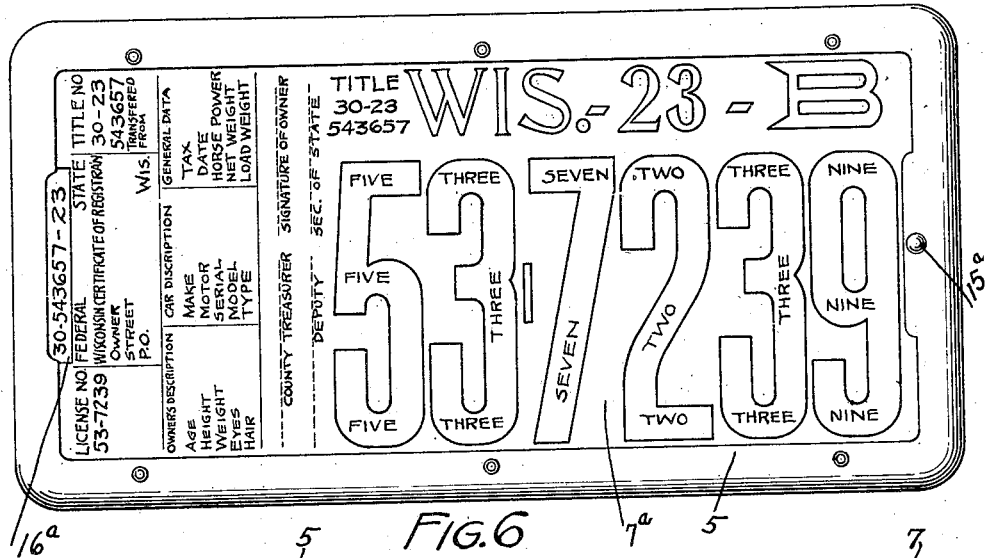
FIG. 6
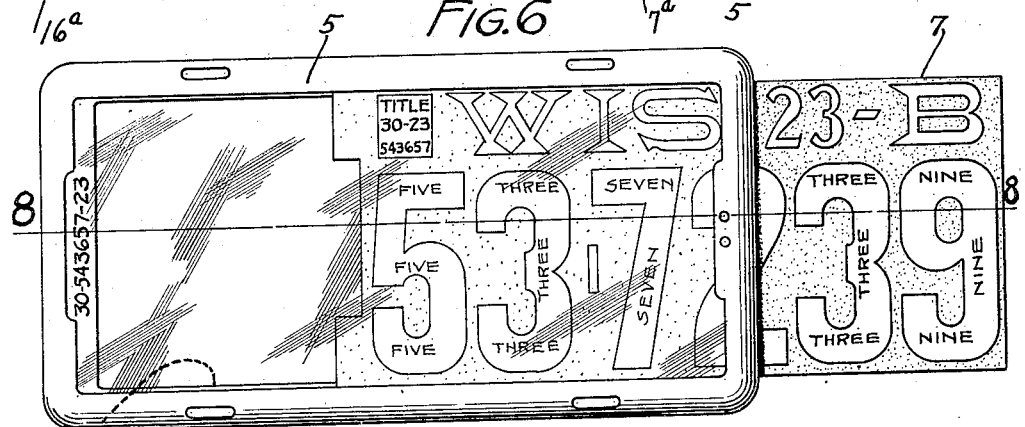
FIG. 7
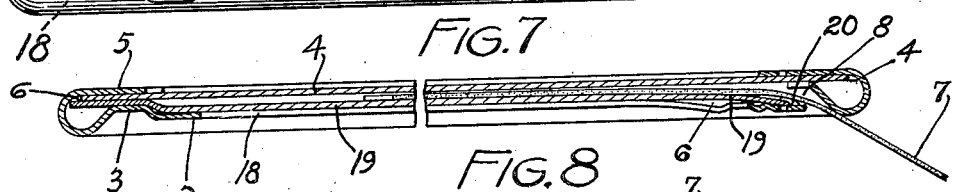
FIG. 8
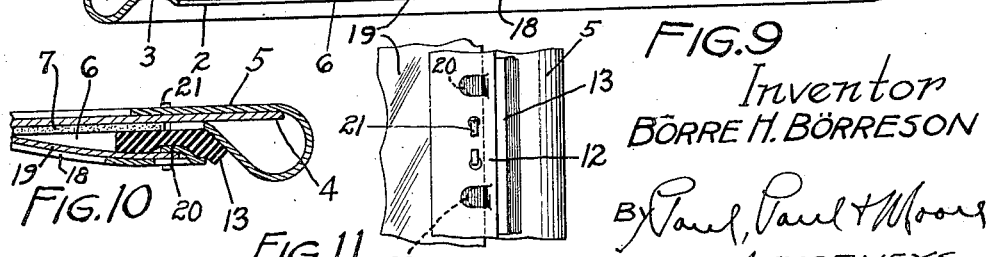
FIG. 9
FIG. 10
FIG. 11
Inventor
BÖRRE H. BÖRRESON
By Paul, Paul & Moore
ATTORNEYS Patented Dec. 23, 1924.

1,520,324

UNITED STATES PATENT OFFICE.

BÖRRE H. BÖRRESON, OF ST. PAUL, MINNESOTA.

VEHICLE LICENSE OR CARD HOLDER.

Application filed June 4, 1923. Serial No. 643,289.

*To all whom it may concern:*

Be it known that I, BÖRRE H. BÖRRESON, a citizen of the United States, resident of St. Paul, county of Ramsey, and State of Minnesota, have invented certain new and useful Improvements in Vehicle License or Card Holders, of which the following is a specification.

The object of my present invention is to provide improved means for sealing the opening in the holder through which the tag or card is inserted for the purpose of preventing anyone from tampering with the card or license and also to prevent the entrance of dust and moisture into the holder.

A further object is to provide means for displaying the title or State number of the car in connection with the license holder in such a manner that it is clearly visible to even a casual observer.

A further object is to provide a means for mounting the tag so that the number or legend thereon will be visible at night.

Other objects of the invention will appear from the following detailed description.

The invention consists generally in various constructions and combinations all as hereinafter described and particularly pointed out in the claims.

In the accompanying drawings forming part of this specification,

Figure 6 is a view of a license tag holder showing the ownership certificate on the license tag;

Figure 7 is a view showing the holder with the rear plate cut away to allow the insertion of a second transparent sheet for displaying the license number at night;

Figure 8 is a sectional view on the line 8—8 of Figure 7;

Figure 9 is a transverse sectional view of the holder with the double transparent plates therein;

Figure 10 is a detail sectional view showing the preferred form of sealing means used with the double transparent plates;

Figure 11 is a detail view showing the means for fastening the sealing means in place and the guards for the end of one of the transparent sheets.

Figure 1:
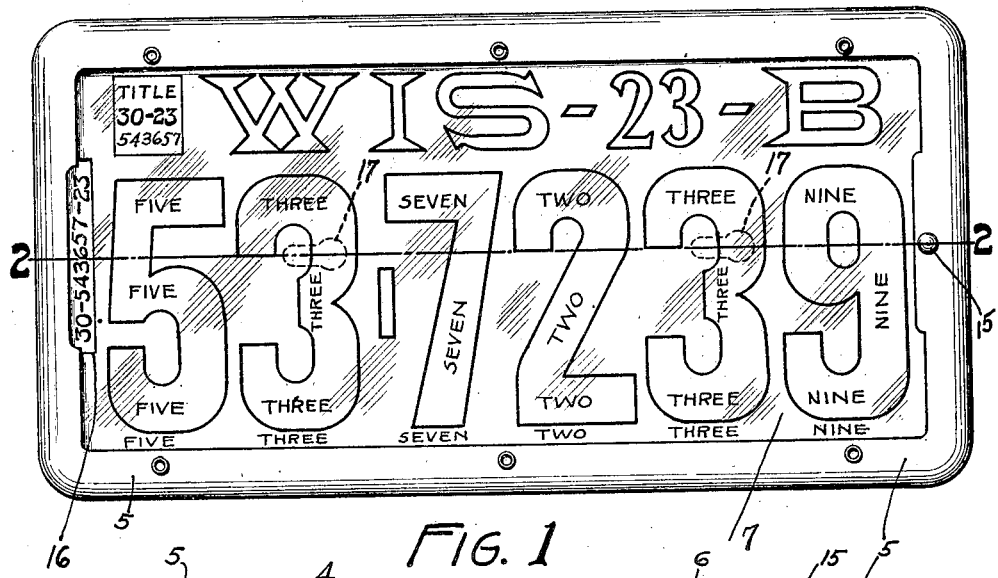
Figure 1 is a plan view of a license or tag holder embodying my invention.

In the drawing, 2 represents the rear portion of the holder having a ribbed outer portion 3 upon which the sheet of mica or other transparent material 4 is placed, the edges 5 of the plate being folded around over the edges of the transparent plate and cooperating with the rear portion of the holder to form a frame corresponding substantially to those shown and described in my United States Patent No. 1,414,251, issued April 25, 1922. This holder, as described in the said patent, is formed by means of dies suitably shaping the plate to provide a seat for the transparent member and then rolling or folding the edges of the metal around the transparent plate to completely cover the edges thereof and seal the joint between it and the ribbed portion of the holder upon which the plate is seated. This ribbed portion projecting inwardly and formed by the action of the die provides a shallow recess 6 between the rear plate and the transparent member, said recess being adapted to receive the card or license tag 7 placed therein. For the insertion of this tag or card into the holder, I provide a slot 8 at one end of the plate 2 extending transversely from side to side of the holder; the adjacent edge 9 of the plate being comparatively thin and overhanging this slot and preferably provided with a series of lugs 10 formed by cutting notches 11 in the opposite edge of the slot. At the center, the plate is preferably provided with an ear 12 also formed on the edge of the plate by cutting out the metal, and between the edges of the plate within the slot, I insert a strip 13 of flexible resilient material, preferably rubber. This strip, as shown plainly in Figure 2, bridges the slot in the metal and extends a considerable distance on both sides and the plate preferably has transverse ribs 14 therein which are pressed into the yielding strip and cooperate therewith to form a dust and moist-proof joint. The lugs 10 also dig into the surface of the strip and aid in holding it securely in place, and as a sealing means, I prefer to provide a rivet 15 which may be split as preferred, having heads formed on the ends thereof and operating when tightened to squeeze the edge of the plate 2, the strip 13, and the edges of the slot firmly together and effectually seal the joint between them preventing the entrance of moisture and dust within the holder. The rivet will also prevent any unauthorized person from opening the holder and changing the tag or license, the removal of the rivet being instantly detected.

As shown in Figure 1, I provide a notch in the end of the tag forming an opening through which the surface of the back plate of the holder is visible, and in or on this surface I provide a legend or number which I will designate as the title number of the car. It is a record of ownership and transfer of ownership of the car. The original is usually filed with the secretary of state and a duplicate given the owner for safekeeping. This title number may be designated as the State number and is entirely independent and distinct of the license number. It may appear on the front as well as the rear license tag holders. This title number stamped or impressed in the back of the container will be visible through the celluloid sheet and it will be impossible to alter this title number without destroying or damaging the container to such an extent that the attempted alteration would be instantly detected. The legend embracing this title number will consist of the year of issue of the title and the title number; the owner holding the same title number as long as he has the ownership of the same car.

Figure 2:
Figure 2 is a sectional view on the line 2—2 of Figure 1.
Figure 3:
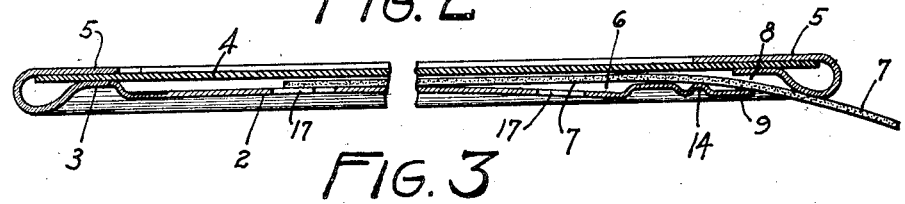
Figure 3 is a similar view showing the operation of inserting the card or license into the holder.
Figure 4:
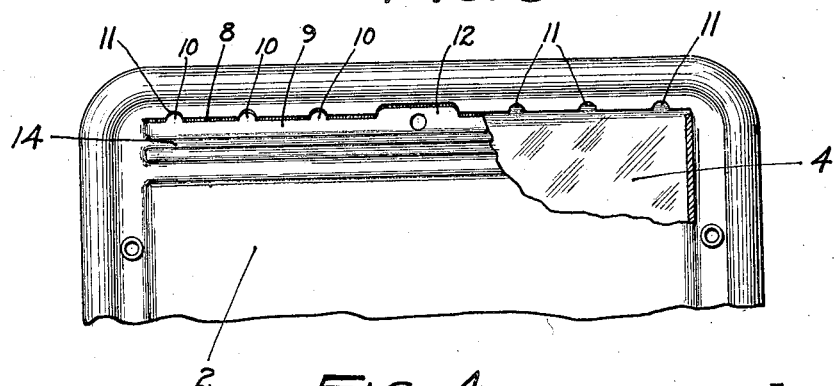
Figure 4 is a detail view showing the opening in the holder through which the license or card is inserted.
Figure 5:
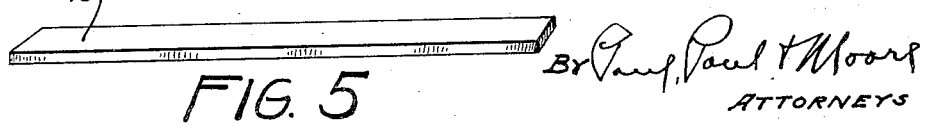
Figure 5 is a perspective view of the sealing strap or plate.

As shown in Figures 1, 2 and 3, the back of the holder is preferably provided with keyhole slots 17 through which a suitable means may be passed for securing the holder to the vehicle.

In Figure 6, I have shown a holder having a license tag with a certificate of registration thereon bearing a description of the owner and the car and other data of record with the secretary of state issuing the license. The State or title number is visible through an opening provided in the tag or the ownership certificate.

In Figure 7, a slightly modified construction is shown which consists in removing a portion of the back of the holder, forming an opening 18 which is closed by a second transparent sheet 19, the license tag being arranged in the holder between this sheet and the opposite sheet 4. The purpose of this second transparent sheet is to provide for the passage of rays of light through the holder so that the license tag can be read at night; the figures being visible with the light in the rear of the holder. In such case, the exposed face of the front transparent plate is preferably roughened or finished in such a way so that it will not reflect any rays of light, and by such reflection make the number of the license tag invisible. To facilitate the insertion of the license tag into the holder where the second transparent plate is used, I prefer to press lugs 20 out of the frame at one end of the holder to overlap the adjacent end of the rear transparent plate so that when the license tag is thrust through the slot in the holder, it will slide over the edge of this plate without catching thereon.

A split rivet 21 is preferably provided for securing the yielding sealing strip 13 in the gap at the end of the holder through which the tag is inserted. In other respects, the holder shown in the second sheet of the drawings herewith is substantially the same as illustrated and described in Sheet 1.

In various ways, the details of construction herein shown and described may be modified and still be within the scope of my invention.

I claim as my invention:

1. A card or tag holder comprising a plate having a seat for a card or tag and an opening for insertion of the card, and a flexible resilient material secured in said opening to afford a dust and moist-proof closure for the opening.

2. A card or tag holder having a slotted opening through which the card is inserted to its seat within said holder, a strip of yielding material fitting within said opening, and means passing through said plate for securing said yielding material in said opening and sealing the interior of said holder against dust and moisture.

3. A card or tag holder comprising a plate having seats for a card and for a transparent plate placed thereover, the edges of said plate being folded over upon said transparent plate for holding it in position, said plate having an opening therein for the insertion of the card to its seat, a strip of flexible material fitting within said opening between the flanged edges thereof, and a rivet passing through said plate and clamping said yielding strip securely in said opening.

4. A card or tag holder having a seat adapted to receive a license tag whereon the license number appears, a transparent plate fitting over said seat and the license tag and through which the license is visible, said license tag having a recess therein through which a rear surface of the holder is visible, on which surface the title or ownership number or character different from the license number is placed.

5. A card or tag holder comprising a frame having seats therein for a license tag and a transparent plate in front of said tag, a similar plate in the rear of said tag, said holder having a slot at one end through which the license tag is inserted into its seat between said plates, and guide lugs overlapping the adjacent end of said rear plate to prevent the license tag when inserted from catching thereon.

6. A card or tag holder comprising a frame open at the front and rear, a license number tag fitting within the frame, and a flexible light-rays transmitting plate applied to the front of the license number tag and having a non-reflecting outer exposed surface.

In witness whereof, I have hereunto set my hand this 29th day of May, 1923.

BÖRRE H. BÖRRESON.